US009100921B2

(12) United States Patent
Xu et al.

(10) Patent No.: US 9,100,921 B2
(45) Date of Patent: *Aug. 4, 2015

(54) TRANSMIT POWER MEASUREMENT AND CONTROL METHODS AND APPARATUS

(75) Inventors: Bing Xu, Gilbert, AZ (US); Mahibur Rahman, Chandler, AZ (US); Chunmig Zhao, Chandler, AZ (US)

(73) Assignee: Apple Inc., Cupertino, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 13/590,008

(22) Filed: Aug. 20, 2012

(65) Prior Publication Data
US 2013/0045773 A1 Feb. 21, 2013

Related U.S. Application Data

(63) Continuation of application No. 12/262,943, filed on Oct. 31, 2008, now Pat. No. 8,249,531.

(51) Int. Cl.
| | |
|---|---|
| *H04B 1/04* | (2006.01) |
| *H04W 52/08* | (2009.01) |
| *H04W 52/10* | (2009.01) |
| *H04W 52/52* | (2009.01) |
| *H04W 52/26* | (2009.01) |
| *H04L 27/00* | (2006.01) |

(52) U.S. Cl.
CPC .............. *H04W 52/08* (2013.01); *H04W 52/10* (2013.01); *H04W 52/52* (2013.01); *H04L 27/0012* (2013.01); *H04W 52/262* (2013.01)

(58) Field of Classification Search
CPC ..... H04W 52/06; H04W 52/08; H04W 52/10; H04W 52/18; H04W 52/26; H04W 52/262; H04W 52/38; H04W 52/52

USPC .................................. 455/127.1, 127.2, 126
See application file for complete search history.

(56) References Cited

U.S. PATENT DOCUMENTS

| | | | |
|---|---|---|---|
| 4,700,151 A | 10/1987 | Nagata | |
| 6,735,420 B2 * | 5/2004 | Baldwin | ..................... 455/127.2 |
| 7,209,717 B2 | 4/2007 | Okada et al. | |
| 7,418,244 B2 | 8/2008 | Montalvo | |

(Continued)

OTHER PUBLICATIONS

3rd Generation Partnership Project; Technical Specification Group Radio Access Network; Evolved Universal Terrestrial Radio Access (E-UTRA); User Equipment (UE) radio transmission and reception (Release 8) 3GPP TS 36.101 V8.1.0 bis Mar. 2008.

*Primary Examiner* — Duc M Nguyen
(74) *Attorney, Agent, or Firm* — Meyertons, Hood, Kivlin, Kowert & Goetzel, P.C.

(57) ABSTRACT

Embodiments include methods and apparatus for performing transmit power control. A gain application element receives a sequence of digital input samples and a digital gain signal, and combines the digital gain signal with the digital input samples to generate a sequence of gain-compensated digital samples. A power amplifier receives and amplifies an analog version of the gain-compensated digital samples in order to generate an antenna output signal. A feedback path generates an analog feedback signal from the antenna output signal, produces a sequence of digital feedback samples from the analog feedback signal, and generates difference values based on the digital feedback samples. When a specified type of constant modulus symbol is represented in the antenna output symbol, the feedback path accumulates the difference values into an accumulated error value, and produces the digital gain signal from the accumulated error value.

14 Claims, 7 Drawing Sheets

(56) References Cited

U.S. PATENT DOCUMENTS

| | | |
|---|---|---|
| 7,577,211 B2 | 8/2009 | Braithwaite |
| 7,873,333 B2 | 1/2011 | Tanaka et al. |
| 8,000,408 B2 | 8/2011 | Premanakathan et al. |
| 8,422,968 B2* | 4/2013 | Donovan et al. ............ 455/127.2 |
| 8,548,400 B2* | 10/2013 | Traylor et al. ................ 455/110 |
| 2003/0103003 A1* | 6/2003 | Ferreol et al. ................. 342/387 |
| 2004/0137863 A1* | 7/2004 | Walton et al. ................. 455/130 |
| 2004/0189378 A1 | 9/2004 | Suzuki et al. |
| 2004/0232984 A1 | 11/2004 | Meade et al. |
| 2005/0220200 A1 | 10/2005 | Giannakis et al. |
| 2005/0286653 A1* | 12/2005 | Lai et al. ........................ 375/308 |
| 2006/0176981 A1* | 8/2006 | Nam et al. ..................... 375/332 |
| 2006/0189285 A1 | 8/2006 | Takano et al. |
| 2007/0104250 A1* | 5/2007 | Rice .............................. 375/146 |
| 2007/0265016 A1* | 11/2007 | Kahtava et al. ............ 455/452.2 |
| 2008/0081655 A1 | 4/2008 | Shin et al. |
| 2009/0046693 A1 | 2/2009 | Nory et al. |
| 2009/0073922 A1* | 3/2009 | Malladi et al. ................. 370/328 |
| 2009/0154598 A1* | 6/2009 | Jensen .......................... 375/308 |
| 2009/0280758 A1* | 11/2009 | Pratt et al. .................. 455/127.2 |

* cited by examiner

TRANSMIT POWER MEASUREMENT AND CONTROL METHODS AND APPARATUS

PRIORITY

This application is a continuation of and claims priority to co-owned co-pending U.S. patent application Ser. No. 12/262,943 of the same title filed Oct. 31, 2008 (issuing as U.S. Pat. No. 8,249,531), the foregoing incorporated herein by reference in its entirety.

TECHNICAL FIELD

Embodiments of the inventive subject matter relate to transmit power measurement and control methods and apparatus, and more particularly to transmit power measurement and control in wireless communication devices.

BACKGROUND

Current cellular wireless standards include stringent transmit power control requirements. For example, some orthogonal frequency division multiplexing (OFDM) standards (including variants of generic OFDM, such as Single Carrier Frequency Division Multiple Access (SC-FDMA) standards) include transmit power control requirements that deal with peak-to-average ratios (PARs) of 6.5 decibels (dB) or higher for both 16-QAM (Quadrature Amplitude Modulation) and Quadrature Phase Shift Key (QPSK) modulation. In order to address such requirements, a conventional wireless communication device may include a transmit power control system for amplification and transmission of a wireless signal. Such a system may include a power control feed-forward path and a transmit power detector feedback path. A power amplifier and variable gain amplifier (VGA) along the power control feed-forward path amplifies the signal to be transmitted. The transmit power detector feedback path measures the power of the amplified signal, and determines and provides control or bias voltages to apply to the system's power amplifier and VGA, thus controlling the transmit power ramp up and ramp down curves.

The emerging $3^{rd}$ Generation Partnership Project (3GPP) Long Term Evolution (LTE) standards specify that a single 3GPP LTE symbol is to be represented using QPSK, 16-QAM or 64-QAM, where 12 constellation points are selected as a data-dependent subset of a selected QAM constellation. In addition, under emerging 3GPP LTE standards, each transmit sub-frame may include a plurality of information-bearing symbols and two demodulation reference symbols located at fixed symbol positions within the sub-frame. In addition, occasional sub-frames also may include a sounding reference symbol (SRS) that replaces an information-bearing symbol of the sub-frame (e.g., the last symbol). Prior to transmission, the amplitude of the SRS may be transmitted at a different power level from the power level of the information-bearing and demodulation reference symbols.

Power measurement and control techniques for 3GPP LTE devices should be adapted to take into account this multi-level, modified QAM modulation. However, because a single 3GPP LTE symbol is represented using only a subset of available constellation points (e.g., 12 of 16 constellation points), not enough samples may be available to achieve sufficiently accurate power measurement and/or control using power measurement and control techniques currently employed in conjunction with conventional OFDM, 16-QAM modulation or other conventional power measurement and control techniques. In addition, conventional power measurement and control techniques are not adapted to take into account the multi-level modulation performed in conjunction with transmitting the SRSs.

Accordingly, methods and apparatus are desired for performing transmit power measurement and control for wireless communication devices in which insufficiently accurate power measurement and/or control may result from the use of conventional power measurement and control techniques. In particular, methods and apparatus for performing transmit power measurement and control are desired for wireless communication devices in which multi-level QAM modulation is performed (e.g., devices that employ a 3GPP LTE standard or another standard for which current power measurement and/or control techniques are unsuitable) and/or in which a data-dependent subset of available QAM constellation points are used to represent a symbol.

DETAILED DESCRIPTION

Embodiments described herein include methods and apparatus for measuring and controlling the power applied to transmitted radio frequency (RF) signals. Embodiments may be implemented, for example, in wireless systems, networks, and devices adapted to implement 2G (second generation), 2.5G (2.5 generation), 3G (third generation), 4G (fourth generation), and/or other wireless telephone technologies. For example, but not by way of limitation, embodiments may be implemented in wireless systems, networks, and devices that operate in accordance with one or more of various standards within a group that includes the family of $3^{rd}$ Generation Partnership Project (3GPP) standards (e.g., Global System for Mobile Communications (GSM) standards and/or Universal Mobile Telecommunications System (UMTS) standards). Examples of such standards include, but are not limited to, UMTS Rev. 8 (e.g., 3GPP Long Term Evolution (LTE), Enhanced Data Rates for Global System for Mobile Communications (GSM) Evolution (EDGE), Wideband Code Division Multiple Access (W-CDMA), High Speed Orthogonal frequency division multiplexing Packet Access HSOPA)), High Speed Packet Access (HSPA), UMTS Time Division Duplexing (UMTS-TDD) (e.g., TD-CDMA and TD-SCDMA), Freedom of Mobile Multimedia Access (FOMA), General Radio Packet Service (GPRS), Circuit Switched Data (CSD), and High Speed CSD (HSCSD)). Alternate embodiments may be implemented in wireless systems, networks, and devices that operate in accordance with one or more other standards within a group that includes the family of $3^{rd}$ Generation Partnership Project 2 (3GPP2) standards (e.g., CDMAOne, CDMA2000, Evolution-Data Optimized (EV-DO), and Ultra Mobile Broadband (UMB)). Still other alternate embodiments may be implemented in wireless systems, networks, and devices that operate in accordance with one or more other standards within a group that includes the family of Advanced Mobile Phone System (AMPS) standards (e.g., AMPS or digital AMPS (D-AMPS)). Still other alternate embodiments may be implemented in wireless systems, networks, and devices that operate in accordance with one or more other standards within a group that includes Institute of Electrical and Electronics Engineers (IEEE) 802 standards (e.g., 802.16 (e.g., Worldwide Interoperability for Microwave Access (WiMAX)), IEEE 802.20, and IEEE 802.22) and/or standards based on other wireless technologies. Although a particular type of wireless system, network, and/or device may be described herein for example purposes, the example system is not to be interpreted as limiting the scope of the various embodiments or the claims only to the below-described system or device. For example, embodiments below may be described in conjunction with a 3GPP LTE system, network, device, and/or protocol, and the examples are not meant to limit application of the embodiments only to 3GPP LTE systems, networks, devices, and/or protocols.

Figure 1:
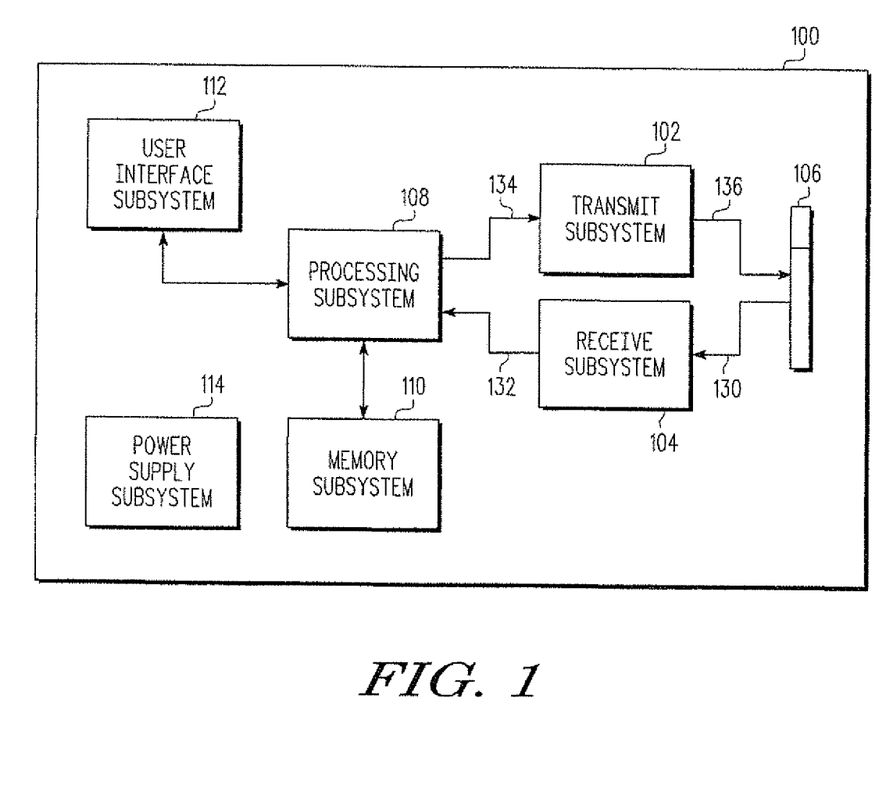
FIG. 1 illustrates a simplified block diagram of a wireless device, in accordance with an example embodiment.

FIG. 1 illustrates a simplified block diagram of a wireless device 100, in accordance with an example embodiment. Device 100 is adapted to transmit electromagnetic signals over an air interface. In a particular embodiment, wireless device 100 is adapted to transmit 3GPP LTE signals over the air interface according to a 3GPP LTE standard, although wireless device 100 may be adapted to transmit different types of wireless signals over the air interface according to different standards, in other embodiments. Wireless device 100 may form substantially all of or a portion of a variety of different types of apparatus. For example, but not by way of limitation, wireless device 100 may form substantially all of or a portion of a cellular telephone, a radio, a personal data assistant (PDA), a computer (e.g., a laptop, notebook, desktop or other type of computer), a mobile internet device (MID), and/or another device that is adapted to transmit electromagnetic signals over an air interface.

Wireless device 100 includes at least one transmit subsystem 102, receive subsystem 104, antenna 106, processing subsystem 108, memory subsystem 110, user interface subsystem 112, and power supply subsystem 114, in an embodiment. These subsystems are communicatively coupled together as illustrated in FIG. 1, where the term "communicatively coupled" means that information signals are transmissible through various interconnections between the subsystems. The interconnections between the subsystems may be direct interconnections that include conductive transmission media, or may be indirect interconnections that include one or more intermediate electrical components. Although certain interconnections are illustrated in FIG. 1, it is to be understood that more, fewer or different interconnections may be present in other embodiments.

The at least one processing subsystem 108 is adapted to perform various functions. These functions may include, for example, generating outgoing digital signals 134, processing incoming digital signals 132, interfacing with the at least one memory subsystem 110 to store and retrieve data, interfacing with the at least one user interface subsystem 112, and performing various power control functions in conjunction with the at least one power supply system 114. The at least one power supply system 114 may include, for example, an interface to line power and/or a battery power subsystem.

User interface subsystem 112 may include one or more user interface components adapted to enable a user to input commands or other information into device 100 and/or to provide visual, auditory, or mechanical indicia intended to convey information to the user. For example, but not by way of limitation, user interface subsystem 110 may include one or more display screens, touch screens, lights, speakers, vibration devices, keypads, buttons, dials, and/or other components adapted to receive input commands and/or to produce information-conveying indicia.

Memory subsystem 110 may include one or more components adapted to store digital information in a retrievable format. For example, but not by way of limitation, memory subsystem 110 may include one or more removable or non-removable, volatile or non-volatile memory components, such as read only memory (ROM)-based memory components, random access memory (RAM)-based memory components, compact disks (CDs), digital video disks (DVDs), and/or magnetic storage media (e.g., hard disks or floppy disks), to name a few.

Receive subsystem 104 is adapted to receive incoming RF signals 130 from antenna 106, and to perform down-conversion, filtering, and analog-to-digital conversion, among other things, to the incoming RF signals 130 in order to generate incoming digital signals 132. The incoming digital signals 132 may be processed by processing subsystem 108. In an alternate embodiment, for a transmit-only type of device, receive subsystem 104 may be excluded.

According to an embodiment, processing subsystem 108 may include a baseband processor, and outgoing digital signal 134 may be generated as sequence of digital samples representative of symbols to be transmitted. The outgoing digital signal 134 is provided to transmit subsystem 102. Transmit subsystem 102 (also referred to herein as a "transmitter" or "RF transmitter") is adapted to receive the outgoing digital signals 134 generated by processing subsystem 108, and to perform digital-to-analog conversion, up-conversion, gain adjustment, and amplification, among other things, to the outgoing digital signals 134 in order to generate outgoing RF signals 136. The outgoing RF signals 136 are transmitted over the air interface by antenna 106. The resulting signal is amplified by an output amplifier of transmit subsystem 102, and provided to the device's antenna 106.

RF signals transmitted by the device's antenna 106 may be received by infrastructure (e.g., a base station or "Node B", not illustrated) associated with a wireless communication system. According to prevailing regulations, the wireless device 100 may be restricted only to transmit RF signals within a pre-defined "uplink" frequency band. For example, a particular communication system may support communications within a frequency band between about 1920 megahertz (MHz) and about 1980 MHz, which corresponds to about 60 MHz total bandwidth. In alternate embodiments, a communication system may support communications within different frequency bands and/or may have a wider or narrower bandwidth.

According to an embodiment, wireless device 100 transmits information in the time domain within the context of a radio frame. A radio frame may be defined as an information-bearing entity within which data and other information (e.g., pilot signals) are represented and transmitted by a wireless device (e.g., wireless device 100). In an embodiment, a radio frame is a segment of time having a duration. Each radio frame may be divided into a plurality of sub-frames. In an embodiment, each radio frame has a duration of about 10 milliseconds (ms), and is divided into 20 sub-frames. Accordingly, in an embodiment, a sub-frame may have a duration of about 1 ms, although a sub-frame may have a longer or shorter duration, in other embodiments. In addition, each radio frame may have a longer or shorter duration and/or may be divided into more or fewer sub-frames than indicated above, according to other embodiments.

According to an embodiment, frequency division duplexing (FDD) is performed in conjunction with transmitting the sub-frames of a radio frame. For example, in an embodiment in which a radio frame includes 20 sub-frames, 10 sub-frames of the radio frame may be available for uplink transmissions (e.g., wireless device 100 to base station), and the other 10 sub-frames may be available for downlink transmissions (e.g., base station to wireless device 100). Uplink and downlink transmissions may be separated in the frequency domain. In an embodiment in which half-duplex FDD is implemented, wireless device 100 may be restricted from transmitting and receiving simultaneously. In an embodiment in which full-duplex FDD is implemented, wireless device 100 may transmit and receive simultaneously.

Figure 2:
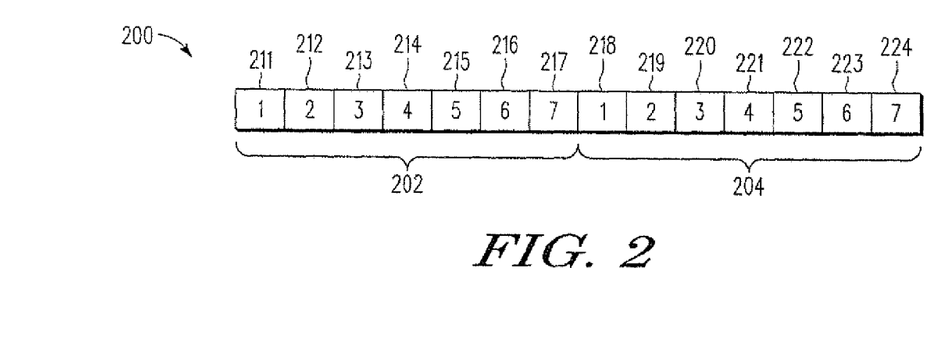
FIG. 2 is an example of the structure of a sub-frame, according to an example embodiment.

FIG. 2 is an example of the structure of a sub-frame 200, according to an example embodiment. Sub-frame 200 includes two, equally-sized slots 202, 204, in an embodiment, although a sub-frame may include more or fewer slots and/or the slots may be unequal in size, in other embodiments. The duration of each slot 202, 204 is further subdivided into a plurality of symbol positions 211, 212, 213, 214, 215, 216, 217, 218, 219, 220, 221, 222, 223, 224 (referred to simply as "symbols", herein), according to an embodiment. In an embodiment, each slot 202, 204 is subdivided into a set of seven symbols (e.g., symbols 211-217 and 218-224), although each slot 202, 204 may be divided into sets of more or fewer symbols, in other embodiments. A cyclic prefix (CP) may be appended to each symbol as a guard interval, according to an embodiment.

Symbols 211-224 are produced using Quadrature Amplitude Modulation (QAM), according to an embodiment, and accordingly may be referred to as QAM symbols. As will be described in more detail in conjunction with FIGS. 3 and 4, each symbol 211-224 is represented through a subset of available constellation points of a QAM constellation, where different data is represented by different subsets, according to an embodiment. Accordingly, the selection of constellation points for a particular symbol is data dependent, and consecutive symbols may be represented using different subsets of available constellation points. According to an embodiment in which modified 16-QAM modulation is implemented, the number of available constellation points equals 16, and the number of constellation points selected for any given symbol equals 12. In other embodiments, more or fewer constellation points may be available and/or larger of smaller subsets of constellation points may be selected for any given symbol.

Each slot 202, 204 includes a plurality of information-bearing symbols (e.g., symbols 211-213 and 215-217 for slot 202, and symbols 218-220 and 222-224 for slot 204). In addition, in an embodiment, a demodulation reference symbol (DRS) is transmitted at a known symbol position of each slot 202, 204. According to an embodiment, a DRS is transmitted at the fourth (or center) symbol position of each slot 202, 204, or at symbol 214 for slot 202 and symbol 221 for slot 204. In an alternate embodiment, a DRS is transmitted at the first symbol position of each slot 202, 204, or at symbol 211 for slot 202 and symbol 218 for slot 204. In still other alternate embodiments, one or more DRS may be transmitted in other symbol positions from those discussed above.

According to an embodiment, each DRS includes a constant modulus signal. The constant-modulus signal is constant modulus in the frequency domain (not necessarily in the time domain), and may be defined around the unit circle, according to an embodiment, although it may be modulated in a different (but constant) manner, according to other embodiments. Each DRS may be generated based on a prime-length Zadoff-Chu sequence that is either truncated or cyclically extended to a desired length, according to various embodiments. The DRS may be associated with a Physical Uplink Shared Channel (PUSCH) and/or a Physical Uplink Control Channel (PUCCH), according to an embodiment. The DRS may be used during the processes of channel estimation and/or coherent demodulation. In addition or alternatively, as will be discussed in more detail later, the power levels of one or more DRS within a sub-frame may be measured by a transmitter during the process of power measurement and control, according to an embodiment.

During occasional sub-frames (e.g., during one or more sub-frames within a radio frame, such as the first and sixth sub-frames, for example), a sounding reference symbol (SRS) is transmitted at a known symbol position within a sub-frame 200. The SRS replaces an information-bearing symbol of the sub-frame 200. In an embodiment, the SRS is transmitted in the last symbol position within sub-frame 200 (e.g., the seventh symbol position of the second slot 204, or symbol 224). Such an embodiment is described in more detail in conjunction with FIG. 5, later. According to other embodiments, which are described in more detail in conjunction with FIGS. 6 and 7, later, the SRS may be transmitted at a different symbol position from the last symbol position (e.g., the first symbol position of the first slot 202, or symbol 211, the first symbol position of the second slot 204, or symbol 218, or some other symbol position).

The SRS is not associated with a PUSCH or PUCCH, and the SRS has an independent power scaling compared with the PUSCH and PUCCH, according to an embodiment. Accordingly, prior to transmission, the amplitude of the SRS may be transmitted at a different power level from the power level of the information-bearing symbols (e.g., symbols 211-213, 215-220, and 222-223) and the DRS (e.g., symbols 214 and 221) within the sub-frame in which the SRS is transmitted. More particularly, according to an embodiment, the power level of the SRS may be significantly higher than the power level of the information-bearing symbols and the DRS within the sub-frame. In addition, as with the DRS, each SRS is a constant-modulus signal. The constant-modulus signal is constant modulus in the frequency domain (not necessarily in the time domain), and may be defined around the unit circle, according to an embodiment, although it may be modulated in a different (but constant) manner, according to other embodiments. Each SRS may be generated based on a prime-length Zadoff-Chu sequence that is either truncated or cyclically extended to a desired length, according to various embodiments. The SRS may be used during the processes of channel estimation and/or coherent demodulation. In addition or alternatively, as will be discussed in more detail later, the power level of an SRS may be measured by a transmitter during the process of power measurement and control, according to an embodiment.

A "resource block" (RB) or "physical resource block" may be defined as a time-frequency unit that includes a plurality (e.g., 12 or some other number) of contiguous (in frequency) sub-carriers for one symbol period (e.g., symbol 211). According to an embodiment, the plurality of symbols (e.g., symbols 211-217) associated with a single slot (e.g., slot 202) may be transmitted containing a particular number of RBs. Accordingly, the transmitted signal in each slot 202, 204 is described by a resource grid of subcarriers and Single-Carrier Frequency-Division Multiple Access (SC-FDMA) symbols. RBs are allocated to a wireless device (e.g., wireless device 100, FIG. 1) by the wireless system infrastructure (e.g., by a base station). The transmission bandwidth for the wireless system may be divided into a plurality of consecutive RBs, and the edges of each RB may be defined by a low and a high frequency. According to various embodiments, the number of available RBs (in the frequency domain) may be in a range of about 1 to 100 RBs. For a given allocated channel bandwidth, a maximum number of RBs may be transmitted to provide a sufficient guard band. For example, up to 100 RBs may be transmitted for a channel bandwidth of 20 MHz, and up to 6 RBs may be transmitted for a channel bandwidth of 1.4 MHz. The number of available RBs may be larger or smaller, in other embodiments.

Figure 3:
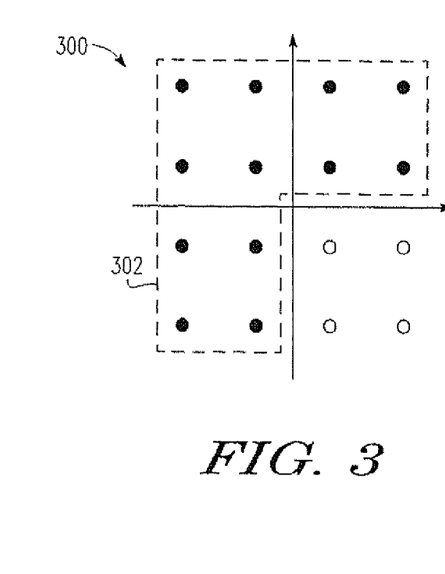
FIG. 3 is a first example of a QAM constellation representing selected constellation points for a first symbol, according to an embodiment.
Figure 4:
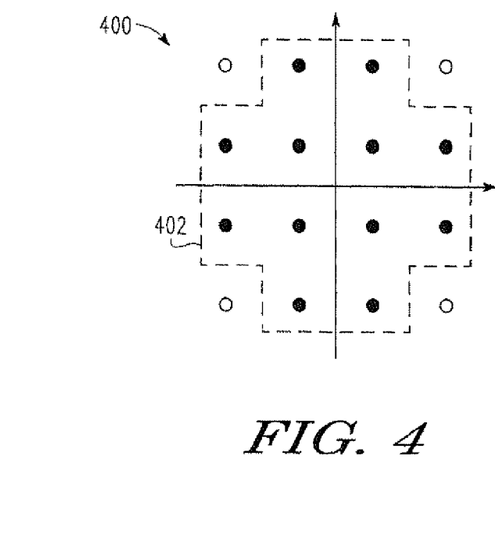
FIG. 4 is a second example of a QAM constellation representing selected constellation points for a second symbol, according to an embodiment.

FIGS. 3 and 4 are first and second examples of QAM constellations 300 and 400 representing selected constellation points for two different symbols, according to an embodiment. The amplitude and phase of each constellation point may be represented at one of the sub-carrier frequencies within an RB, according to an embodiment. Selected constellation points are indicated with solid black circles, and non-selected constellation points are indicated with white-centered circles. The illustrated example constellations 300, 400 represent only two possible constellation point subsets 302, 402 selected from 16 available constellation points, where each subset 302, 402 includes 12 of the 16 available constellation points. A plurality of other constellation point subsets that include constellation points other than those indicated as being selected in the example subsets 302, 402 alternatively may be selected.

In both of the illustrated example constellations 300, 400, and according to a QAM modulation technique of a particular embodiment, a subset 302, 402 of 12 constellation points is selected from a set of 16 available constellation points for any given symbol. Accordingly, seventy-five percent (75%) of the available constellation points is selected for each symbol. In alternate embodiments, different numbers of constellation points may be available (e.g., 64, 128, or another number of available constellation points) for each symbol, and/or a different percentage of constellation points may be selected from the available constellation points to represent the data. According to various embodiments, the number of selected constellation points equals the number of sub-carrier frequencies allocated to represent any given symbol, and the number of sub-carrier frequencies allocated to represent any given symbol is less than the number of available constellation points. Accordingly, for example, when a single RB is allocated to a transmitter, there may be only 14 symbols in a sub-frame. Given the limited number of samples in the constellation, a measured power reading will be intrinsically data dependent.

According to an embodiment, a wireless device (e.g., wireless device 100, FIG. 1) receives information from the wireless system infrastructure (e.g., a base station), which indicates the power at which the wireless device should transmit the symbols within a sub-frame. The wireless device may, therefore, measure the power of its transmitted signals, and may adjust the amplification applied by it's transmit subsystem (e.g., transmit subsystem 102, FIG. 1) according to that measurement. The amplification may be adjusted on a sub-frame by sub-frame basis or less frequently, according to various embodiments. In addition, as discussed previously, when a sub-frame includes an SRS, the amplitude of the SRS may be transmitted at a different (e.g., higher) power level from the power level of the information-bearing symbols and the DRS within the sub-frame.

Figure 5:
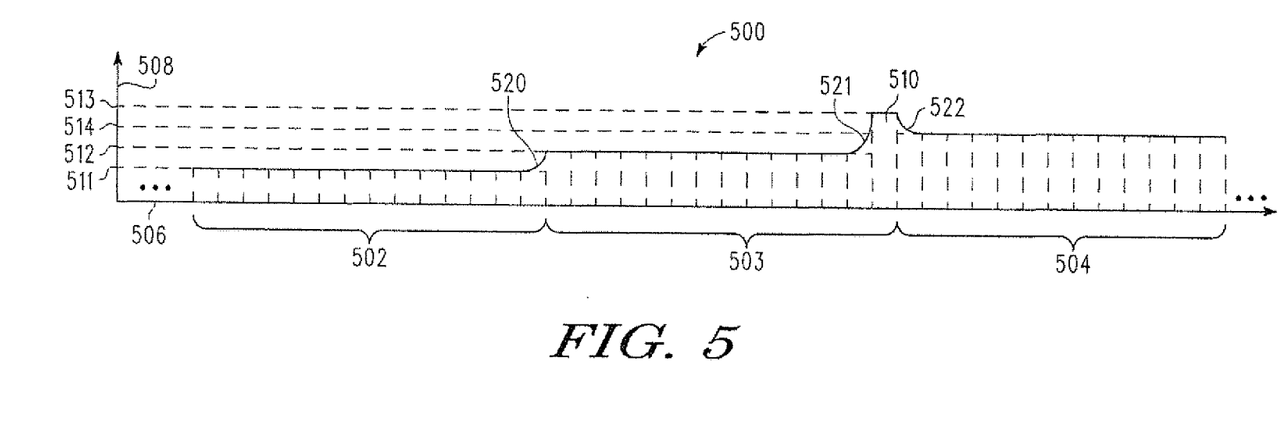
FIG. 5 is a plot illustrating relative transmission power for three, consecutive, example sub-frames, according to an embodiment.

To illustrate the power adjustments that may be made between consecutive transmitted sub-frames and power adjustments that may be made in conjunction with transmitting an SRS, FIG. 5 is a plot 500 illustrating relative transmission power for three, consecutive, example sub-frames 502, 503, 504, according to an embodiment. Plot 500 includes a time axis 506 and a transmit signal power axis 508. A "front" sub-frame boundary refers to a first boundary of a sub-frame that occurs in time at the beginning of transmission of the sub-frame, and a "rear" sub-frame boundary refers to a second boundary of the sub-frame that occurs in time at the end of transmission of the sub-frame. Symbol boundaries within each sub-frame 502-504 are indicated with vertical dashed lines. First and third sub-frames 502 and 504 represent sub-frames in which no SRS is transmitted, and second sub-frame 503 represents a sub-frame in which an SRS is transmitted within symbol position 510. The relative power levels 511, 512, 513, 514 at which the information-bearing symbols, the DRS, and the SRS are transmitted are indicated along the transmit signal power axis 508. It is to be understood that these relative power levels 511-514 are for example purposes only.

As plot 500 indicates, the RF signal corresponding to a first sub-frame 502 is transmitted at a first power level 511 for substantially the entire duration of the first sub-frame 502. The term "substantially the entire duration" means an entire duration minus portions of the duration when a transmit power ramp up or ramp down are being performed (e.g., in proximity to the sub-frame boundaries and/or the SRS boundaries). Prior to the front boundary of the second sub-frame 503, an upward power ramp 520 is applied to the RF signal, and the information-bearing symbols and DRS within the second sub-frame 503 are transmitted at a second power level 512 for substantially the entire duration of the information-bearing symbols and the DRS.

According to an embodiment, and as discussed previously, an SRS may be transmitted at the last symbol position within a sub-frame, or within symbol position 510 of sub-frame 503, as the example of FIG. 5 illustrates. A "front" symbol boundary refers to a first boundary of a symbol that occurs in time at the beginning of transmission of the symbol, and a "rear" symbol boundary refers to a second boundary of the symbol that occurs in time at the end of transmission of the symbol. An SRS may be characterized as a symbol, and accordingly an SRS also may have front and rear boundaries. Because the SRS may be transmitted at a relatively high power level, another upward power ramp 521 is applied to the RF signal prior to the front boundary of symbol position 510 (i.e., the front boundary of the SRS), and the SRS is transmitted at a third power level 513 for substantially the entire duration of symbol position 510. Upon completion of the SRS transmission (e.g., proximate to a rear boundary of symbol position 510 or the SRS), a downward power ramp 522 to a fourth power level 514 is applied to the RF signal, and the third sub-frame 504 is transmitted at the fourth power level 514 for substantially the entire duration of the third sub-frame 504.

Figure 6:
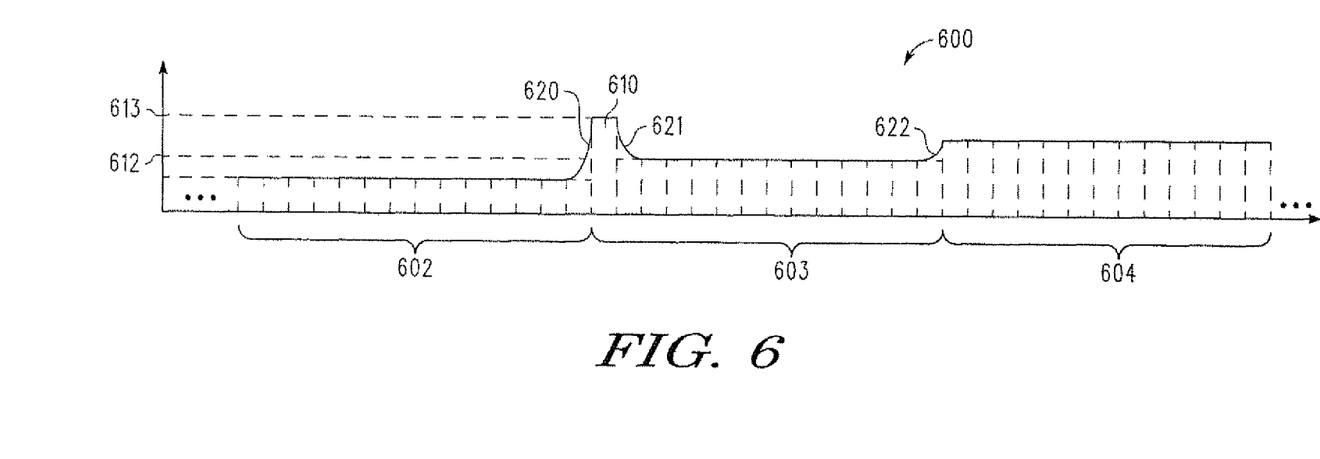
FIG. 6 is a plot illustrating relative transmission power for three, consecutive, example sub-frames, according to an alternate embodiment.
Figure 7:
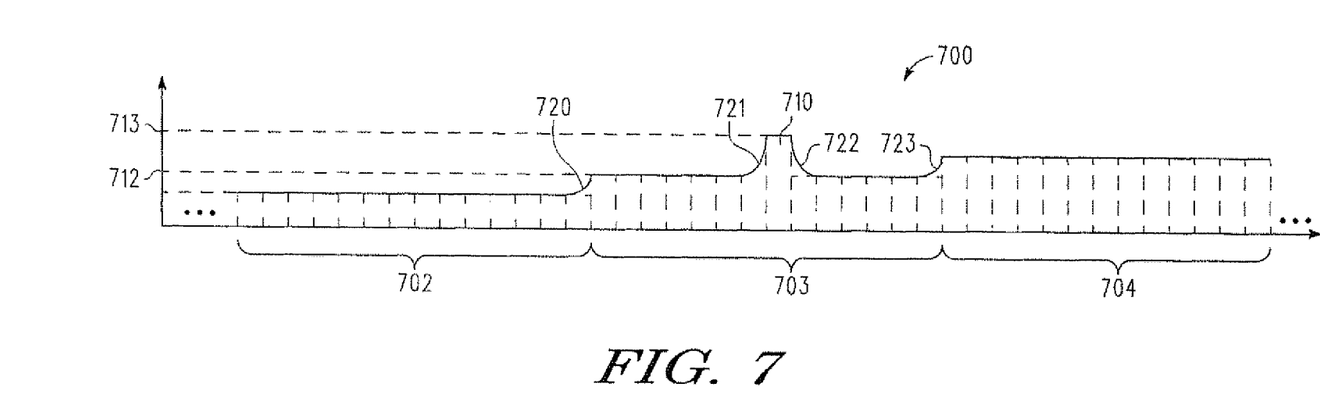
FIG. 7 is a plot illustrating relative transmission power for three, consecutive, example sub-frames, according to another alternate embodiment.

In the embodiment illustrated and described in conjunction with FIG. 5, the SRS is transmitted in the last symbol position within a sub-frame (e.g., the fourteenth symbol position 510 of sub-frame 503). According to other embodiments, the SRS may be transmitted at a different symbol position from the last symbol position of a sub-frame. For example, FIG. 6 is a plot 600 illustrating relative transmission power for three, consecutive, example sub-frames 602, 603, 604, according to an alternate embodiment in which an SRS is transmitted within a first symbol position 610 of a sub-frame 603. Because sub-frame 603 may be divided into two slots (not indicated in FIG. 6), the first symbol position 610 also corresponds to a first symbol position of a first slot of sub-frame 603. As an alternate example, FIG. 7 is a plot 700 illustrating relative transmission power for three, consecutive, example sub-frames 702, 703, 704, according to another alternate embodiment in which an SRS is transmitted within an eighth symbol position 710 of a sub-frame 703. Again, because sub-frame 703 may be divided into two slots (not indicated in FIG. 7), the eighth symbol position 710 also corresponds to a first symbol position of a second slot of sub-frame 703. Even though FIGS. 6 and 7 illustrate two specific examples in which an SRS is transmitted within a symbol position other than the last symbol position of a sub-frame, it is to be understood that other embodiments include transmitting an SRS within a symbol position other than the first or eighth symbol positions of a sub-frame.

As FIGS. 5-7 illustrate, power ramping upward and/or downward of the RF signal may occur proximate to sub-frame boundaries and also proximate to front and rear boundaries of a transmitted SRS. According to an embodiment, only a single power transition is performed in conjunction with a sub-frame in which no SRS is transmitted (e.g., sub-frames 502, 504, 602, 604, 702, 704), where that single power transition may be considered to be the power transition to adjust the RF signal power to the power level at which the next, adjacent sub-frame is to be transmitted (e.g., upward power ramps 520, 720) or, in the case of the embodiment of FIG. 6, the power level at which the SRS is to be transmitted (e.g., upward power ramp 620). Although FIGS. 5-7 indicate a power adjustment proximate to each boundary between sub-frames 502-504, 602-604, 702-704, power adjustments may occur less frequently. Accordingly, when the power level is substantially the same between adjacent sub-frames, a power transition may not be performed between the adjacent sub-frames.

In contrast with sub-frames in which no SRS is transmitted, two or more power transitions may be performed in conjunction with a sub-frame in which an SRS is transmitted (e.g., sub-frames 503, 603, 703). More particularly, for the embodiment illustrated in FIG. 5, and as described previously, a first power transition (e.g., upward power ramp 521) is performed to increase the RF signal power level 512 to the power level 513 specified for transmitting the SRS, and a second power transition (e.g., downward power ramp 522) is performed to decrease the RF signal power from the SRS power level 513 to the power level 514 specified for the next, adjacent sub-frame (e.g., third sub-frame 504). For the embodiment illustrated in FIG. 6, a first power transition (e.g., downward power ramp 621) is performed to decrease the RF signal power from the SRS power level 613 to the power level 612 specified for transmitting the sub-frame in which the SRS is being transmitted (e.g., second sub-frame 603), and a second power transition (e.g., upward power ramp 622) is performed to increase the RF signal power to the power level specified for the next, adjacent sub-frame (e.g., third sub-frame 604). Finally, for the embodiment illustrated in FIG. 7, a first power transition (e.g., upward power ramp 721) is performed to increase the RF signal power to the power level 713 specified for transmitting the SRS, a second power transition (e.g., downward power ramp 722) is performed to adjust the RF signal power from the SRS power level 713 to the power level 712 specified for the sub-frame in which the SRS is being transmitted (e.g., second sub-frame 703), and a third power transition (e.g., upward power ramp 723) is performed to adjust the RF signal power to the level specified for the next, adjacent sub-frame (e.g., third sub-frame 704). Accordingly, more than one (e.g., two or three) power transition may be performed in conjunction with a sub-frame in which an SRS is transmitted. The technique of adjusting the power more than once within a sub-frame (e.g., a sub-frame in which an SRS is transmitted) is referred to herein as "multi-level modulation."

Conventional techniques for power measurement and control do not account for multi-level modulation in conjunction with a sub-frame (e.g., a sub-frame in which an SRS is transmitted). In addition, as discussed previously, embodiments also may implement a modified type of QAM modulation, in which a data-dependent subset of available constellation points is selected for each transmitted, information-bearing symbol. Accordingly, the average transmit signal power between adjacent symbols (e.g., symbols 211 and 212, FIG. 2) may vary significantly simply by virtue of the difference in which constellation points are selected between the adjacent symbols (e.g., power differences are inherent in the modulation technique). Because conventional techniques for power measurement and control do not account for the variable selection of subsets of constellation points from symbol-to-symbol, these techniques may be unsuitable for performing accurate power measurement and control in wireless devices in which embodiments of QAM modulation discussed herein are implemented. As described in more detail below, embodiments include power measurement and control methods and apparatus that account for the power characteristics of modified QAM modulation and potential multi-level modulation performed within a sub-frame. Accordingly, such embodiments may result in more accurate power measurement and control for wireless devices in which such modified QAM modulation and/or multi-level modulation is implemented. According to a particular embodiment, closed loop power control is performed using portions of a feedback signal corresponding to one or more constant modulus signals (e.g., constant modulus in the frequency domain) within a sub-frame, where the one or more constant modulus signals may include any combination of a first DRS, a second DRS, and an SRS. As used herein, the terms "first DRS" and "second DRS" are not meant to imply any particular ordering (e.g., in time) of DRSs within a sub-frame or any particular actual or relative symbol position within a sub-frame.

Figure 8:
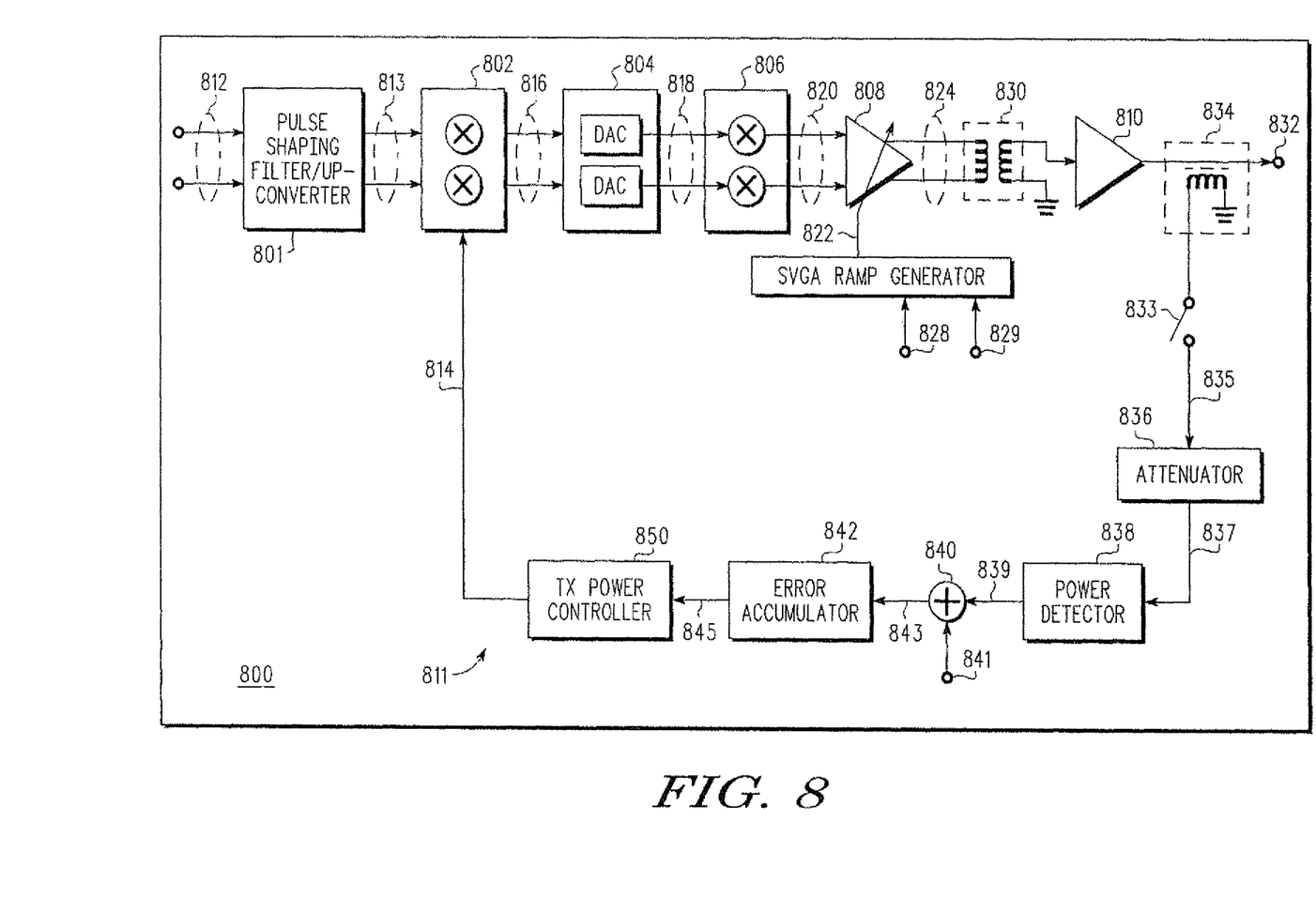
FIG. 8 illustrates a simplified block diagram of a portion of a transmitter, in accordance with an example embodiment.

FIG. 8 illustrates a simplified block diagram of a portion of a transmitter 800, in accordance with an example embodiment. Transmitter 800 may correspond, for example, to transmit subsystem 102, FIG. 1. Transmitter 800 is adapted dynamically to adjust the gain of an RF antenna output signal 832 (e.g., outgoing RF signal 136, FIG. 1), according to an embodiment. Essentially, transmitter 800 performs gain adjustments based on power control commands received from other portions of the system (e.g., from processing subsystem 108, FIG. 1) and based on power measurements of the RF antenna output signal 832 that are performed in a feedback path 811 of the transmitter 800, in accordance with an embodiment.

In an embodiment, transmitter 800 receives a sequence of digital input samples 812 (e.g., outgoing digital signal 134 from processing subsystem 108, FIG. 1). The sequence of digital input samples 812 includes a baseband sequence of multiple input data samples, which may include, for example, a sequence of discrete time samples of a signal to be transmitted (e.g., a transmission burst). In an embodiment, the sequence of digital input samples 812 includes a sequence of complex values represented in Cartesian coordinates, so that each value has a real part (I) and an imaginary part (Q), which are received in parallel. Accordingly, digital input samples 812 may include a sequence of values that may be represented as $X(k)=[I(k), Q(k)]$, where k indicates a sample number and $k=1 \ldots K$, $I(k)$ represents a real part of an input data sample, and $Q(k)$ represents an imaginary part of an input data sample. In alternate embodiments, digital input samples 812 may include sequences of values represented in polar coordinates or some other representation. Digital input samples 812 could represent, for example, baseband, time-domain representations of a sequence of symbols produced using a 3GPP LTE standard. In alternate embodiments, digital input samples 812 could represent a sequence of symbols produced using other standards. According to an embodiment, the sequence of digital input samples 812 is produced in accordance with a sub-frame structure such as that described in conjunction with FIG. 2, where the symbols are modulated using a modified QAM modulation technique, as described above.

Along a forward path, transmitter 800 includes a pulse shaping filter/up-converter 801, a gain application element 802, a digital-to-analog converter (DAC) block 804, an RF modulator 806, a stepped variable gain amplifier (SVGA) 808, and a power amplifier 810. In addition, according to an embodiment, transmitter 800 includes a feedback path 811, which will be described in detail later, and which is adapted to measure the power of the transmitted RF signal (e.g., RF antenna output signal 832) and to provide information that is used to control the RF gains applied to the RF signal (e.g., RF signal 820) prior to transmission.

Pulse shaping filter/up-converter 801 receives the sequence of digital input samples 812 and produces filtered digital input samples 813. According to an embodiment, pulse shaping filter/up-converter 801 is adapted to implement a pulse shaping filter to modify the spectral shape of the digital input samples 812 in order to meet the spectral requirements of an applicable standard (e.g., a 3GPP LTE or other standard). In addition, pulse shaping filter/up-converter 801 is adapted to up-convert the digital input samples 812 to or toward a sampling rate supported by DAC block 804 (e.g., to the DAC sampling rate or to an intermediate frequency). According to an embodiment, pulse shaping filter/up-converter 801 also may include a component adapted to apply a constant gain or attenuation to the digital input samples 812 based on the peak-to-average ratio (PAR) inherent in the modulation technique being implemented.

Gain application element 802 receives the filtered digital input samples 813 and a digital gain signal 814, which is produced by feedback path 811, as will be described later. Gain application element 802 is adapted to apply compensation gains represented by the digital gain signal 814 to the filtered digital input samples 813. More particularly, gain application element 802 applies the compensation gains represented by digital gain signal 814 to the filtered digital input samples 813 in order to generate a sequence of gain-compensated digital samples 816, which may be represented as $X_c(k)=[(G_I(k) \times I(k)), (G_q(k) \times Q(k))]$, for example, where $G_I(k)$ includes a sequence of gain values applied to the real part of the digital input samples 812, and $G_q(k)$ includes a sequence of gain values applied to the imaginary part of the filtered digital input samples 813.

According to an embodiment, the compensation gains represented in digital gain signal 814 may inversely represent differences between a target power of the RF antenna output signal 832 and an actual power of the RF antenna output signal 832. Digital gain signal 814 includes a sequence of digital values (e.g., compensation gain values) that, when applied to filtered digital input samples 813 by gain application element 802, should have the effect of pre-distorting the filtered digital input samples 813 in a manner that mitigates gain application inaccuracies and/or non-linear distortion (referred to collectively as "gain inaccuracies"), which may be produced by one or more non-linear devices in the transmit lineup (e.g., SVGA 808 and/or power amplifier 810). Essentially, digital gain signal 814 includes a sequence of digital values that are inversely related to the gain inaccuracies that may be applied by SVGA 808 and power amplifier 810 (and possibly other transmitter elements) to the RF signal 820.

During times when transmitter 800 is being operated in an open loop power control mode, the compensation gains represented in digital gain signal 814 may remain constant. More particularly, during the open loop power control mode, differences between the target power and the actual power of the RF antenna output signal 832 may not be measured and/or factored simultaneously into the value for the compensation gain provided in the digital gain signal 814. However, feedback path 811 still may be used to perform power measurement. The measured results may be used, for example, to compute errors in open loop control, and compensation values may be factored into future transmissions. During times when transmitter 800 is being operated in a closed loop power control mode, the compensation gain represented in the digital gain signal 814 may vary in response to newly measured differences between the actual power of the RF antenna output signal 832, as will be described in more detail later in conjunction with the discussion of the elements of feedback path 811. According to an embodiment, transmitter 800 is operated in a closed loop power control mode during times that correspond with transmission of a DRS, an SRS or both (e.g., during times when either a DRS or an SRS is being conveyed in RF antenna output signal 832), and transmitter 800 is operated in an open loop power control mode during times that correspond with transmission of information-bearing symbols (e.g., during times when an information-bearing symbol is being conveyed in RF antenna output signal 832). As an example, transmitter 800 may operate in an open loop power control mode while ramping up transmit power to a target level, and transmitter 800 may operate in a closed loop power control mode during transmission of a DRS and/or an SRS in order to maintain an output power level while the operation point (e.g., the collector or bias voltage) of the power amplifier 810 is being adjusted to improve current efficiency.

The gain-compensated digital samples 816 may be upsampled (not illustrated), and provided to DAC block 804, according to an embodiment. DAC block 804 performs a digital-to-analog conversion of the gain-compensated digital samples 816 in order to generate a gain-compensated analog signal 818. The gain-compensated analog signal 818 may be filtered by a baseband filter (not illustrated) in order to attenuate out-of-band components, in an embodiment. RF modulator 806 receives the gain-compensated analog signal 818, and up-converts the gain-compensated analog signal 818 to an appropriate RF carrier frequency in order to generate an RF signal 820.

SVGA 808 is adapted to receive the RF signal 820 from RF modulator 806 and a gain ramp signal 822 from SVGA ramp generator 826. SVGA 808 applies a sequence of gains represented by the gain ramp signal 822 to the RF signal 820 in order to generate a gain-adjusted RF signal 824. In an alternate embodiment, a variable gain amplifier (VGA) may be used instead of SVGA 808 to generate the gain-adjusted RF signal 824.

In order to generate the gain ramp signal 822, SVGA ramp generator 826 receives and evaluates a power change command 828 from another portion of the system (e.g., from processing subsystem 108, FIG. 1). The power change command 828 may specify, for example, a direction of gain change (e.g., indicating a ramp up or a ramp down in gain), and a target gain or gain change for a future sub-frame (e.g., a sub-frame to be transmitted one or two sub-frames later than the sub-frame currently being transmitted), and a direction of change. Alternatively, the power change command 828 may specify a target power level or gain for a future sub-frame. In accordance with the power change command 828, SVGA ramp generator 826 generates the gain ramp signal 822. In an embodiment, the gain ramp signal 822 is generated roughly as a raised cosine curve, which will cause the SVGA 808 smoothly to ramp the gains applied to the RF signal 820 from a first value to a second value that corresponds with a target power level. In an embodiment, the gain ramp signal 822 includes a sequence of codes (e.g., 6-bit codes), each of which corresponds to a gain level that may be applied by SVGA 808 to RF signal 820. An SVGA gain transition, either upward or downward, is implemented by sequentially changing the codes provided within gain ramp signal 822. In an embodiment, the power change command 828 is provided in adequate time before provision of a corresponding timing strobe 829 (described below) for the SVGA ramp generator 826 to calculate the parameters associated with the desired gain transition, which will be represented in the gain ramp signal 822.

In addition to the power change command 828, SVGA ramp generator 826 also receives a timing strobe 829 from another portion of the system (e.g., from processing subsystem 108, FIG. 1), which indicates when SVGA ramp generator 826 is to begin providing the gain ramp signal 822. The power change command 828 and the timing strobe 829 may be received at the same or different signaling interfaces, according to various embodiments. A timing strobe 829 may be received in proximity to and/or prior to a sub-frame front boundary or an SRS front or rear boundary. A timing strobe 829 received in proximity to and prior to a sub-frame front boundary will cause the SVGA ramp generator 826 to begin outputting a gain ramp signal 822 that causes the SVGA 808 to ramp the gains applied to the RF signal 820 from a first value to a second value that corresponds with the target power level for the next sub-frame. A timing strobe 829 received in proximity to and prior to a front SRS boundary will cause the SVGA ramp generator 826 to begin outputting a gain ramp signal 822 that causes the SVGA 808 to ramp the gains applied to the RF signal 820 up from a first value to a second value that corresponds with an SRS power level. Another timing strobe 829 received in proximity to a rear SRS boundary will cause the SVGA ramp generator 826 to begin outputting a gain ramp signal 822 that causes the SVGA 808 to ramp the gains applied to the RF signal 820 down from a first value that corresponds with the SRS power level to a second value that corresponds with the power level for the next sub-frame to be transmitted (e.g., in an embodiment in which the SRS is transmitted in a last symbol position of the sub-frame), or to the power level for the sub-frame in which the SRS is transmitted (e.g., in embodiments in which the SRS is transmitted prior to the last symbol position).

After SVGA 808 applies the gain to the RF signal 820 in accordance with the gain ramp signal 822, the resulting gain-adjusted RF signal 824 (also referred to herein as an "analog version of the gain-compensated digital samples") is de-coupled through transformer 830 (e.g., a balun) and received by power amplifier 810. Essentially, the de-coupled, gain-adjusted RF signal 824 may be considered to be an analog version of the gain-compensated digital samples 816. Power amplifier 810 amplifies the de-coupled, gain-adjusted RF signal 824 to generate an RF antenna output signal 832. The RF antenna output signal 832 is radiated onto the air interface by an antenna (e.g., antenna 106, FIG. 1).

As mentioned above, gain application element 802 applies compensation gains represented by digital gain signal 814 to the digital input samples 812. During operations in a closed loop power control mode, elements of feedback path 811 are activated to measure the power of the RF antenna output signal 832 and to adjust the compensation gains represented in the digital gain signal 814. During operations in an open loop power control mode, adjustments to the compensation gains may not be made simultaneously with measuring signals on feedback path 811. For description purposes, a switch 833 is illustrated in feedback path 811 to indicate operation in an open loop or closed loop power control mode at various times. When switch 833 is closed, operation in a closed loop power control mode may be assumed, and when switch 833 is open, operation in an open loop power control mode may be assumed. In practice, such a switch 833 may not actually be present, and operation in an open loop or closed loop power control mode may otherwise be implemented. Although a particular embodiment of a feedback path is illustrated in FIG. 8 and described herein, it is to be understood that any of a number of other types of feedback paths may be incorporated into transmitter 800, in other embodiments.

In an embodiment, feedback path 811 includes an output signal sensing element 834 (e.g., a transformer), an attenuator 836, a power detector 838, a reference comparator 840, an error accumulator 842, and a transmit (TX) power controller 850. Output signal sensing element 834 senses the power level of the RF antenna output signal 832, and converts that power level into an analog feedback signal 835. In order to prepare the analog feedback signal 835 for further processing, attenuator 836 is adapted to attenuate the analog feedback signal 835 to produce an attenuated analog feedback signal 837, according to an embodiment. In an alternate embodiment, attenuation of the analog feedback signal 835 is not performed, and accordingly analog feedback signal 835 and attenuated analog feedback signal 837 may generically be referred to as an "analog feedback signal".

The analog feedback signal 835 or 837 typically will have a varying power level. Power detector 838 is adapted to sense the power level of the analog feedback signal 835 or 837. More particularly, according to an embodiment, power detector 838 is adapted to convert instantaneous power levels of portions of the analog feedback signal 835 or 837 that correspond with transmission of a DRS, an SRS or both into voltage values. In a particular embodiment, when a DRS or SRS includes a CP, power detector 838 may bypass performing power measurements for those portions of the DRS or SRS that correspond with the CP. Alternatively, power detector 838 may perform power measurements for those portions of the DRS or SRS that correspond with a CP, although those measurements may be disregarded at later stages of the power control process.

According to an embodiment, power detector 838 includes a linear detector, which measures the power level in dBm (i.e., the ratio in decibels (dB) of the measured power referenced to one milliwatt (mW)). Power detector 838 is adapted to produce a digital feedback signal 839 that includes a sequence of values (e.g., voltage values) that represent the sensed power levels. Accordingly, power detector 838 may include an analog-to-digital converter (ADC, not illustrated) adapted to convert the sensed power level of the analog signal (e.g., as measured in dBm) into a digital feedback signal 839. According to an embodiment, the ADC performs a sampling and quantizing process to generate a sequence of digital voltage values, and power detector 838 represents the digital voltage values in the digital feedback signal 839 (e.g., power detector 838 may scale and/or quantize the analog feedback signal samples to produce a sequence of voltage values that are represented in the digital feedback signal 839). Power detector 838 also may include a power measurement block (not illustrated) that computes the average value of the digital voltage values over a programmable period of time.

Reference comparator 840 is adapted to compare the values represented in digital feedback signal 839 with a reference signal 841 in order to generate a difference signal 843. The reference signal 841 represents the desired power level at which the RF antenna output signal 832 should be transmitted. Accordingly, the difference signal 843 generated by reference comparator 840 includes values that represent differences between the actual power level at which the RF antenna output signal 832 is being transmitted and the desired power level at which the RF antenna output signal 832 should be being transmitted. While the transmitter is being operated in a closed loop power control mode, the values represented in difference signal 843 are accumulated by error accumulator 842 to produce an accumulated error value 845.

TX power controller 850 generates the digital gain signal 814 based on the accumulated error value 845. According to an embodiment, and as discussed previously, the digital gain signal 814 is generated to include compensation gain values that may inversely represent the differences between a target power of the RF antenna output signal 832 and an actual power of the RF antenna output signal 832, where the differences are reflected in the accumulated error value 845.

According to an embodiment, TX power controller 850 also may be adapted dynamically to adjust the digital gain signal 814 to maintain a substantially constant transmit power level while the collector or bias voltage of power amplifier 810 is being adjusted based on a target transmit power. In order to optimize the efficiency of power amplifier 810, power amplifier 810 normally may be operated at a minimum collector or bias voltage that provides sufficient linearity at the transmitted power level. Adjustments to the collector or bias voltage of power amplifier 810 may result in improved efficiency of power amplifier 810 under different loading conditions. In the case of implementing a power increase, the collector or bias voltage may be adjusted prior to the power change. In the case of implementing a power decrease, the collector or bias voltage may be adjusted after the power change. For example, when the power of an upcoming sub-frame is higher than the power of a sub-frame currently being transmitted, the collector or bias voltage of power amplifier 810 may be adjusted at or in proximity to the DRS symbol of the second slot of the current sub-frame. While the collector or bias voltage is being adjusted, transmitter 800 may be operated in a closed loop power control mode in order to compensate for the gain change of power amplifier 810, and to achieve a substantially constant output power. When the power of an upcoming sub-frame is lower than the power of the current sub-frame, the collector or bias voltage of power amplifier 810 may be adjusted at or in proximity to the DRS symbol of the first slot in the upcoming sub-frame. In both cases, while the collector or bias voltage is being adjusted, transmitter 800 is operated in a closed loop power control mod in order to compensate for gain changes applied by power amplifier 810, and to achieve a substantially constant output power during the DRS symbol. Operating in a closed loop power control mode during transmission of a DRS may ensure enhanced power accuracy during the closed loop power control mode of operation. For power changes that will occur due to the presence of an SRS, similar methods may be applied.

Figure 9:
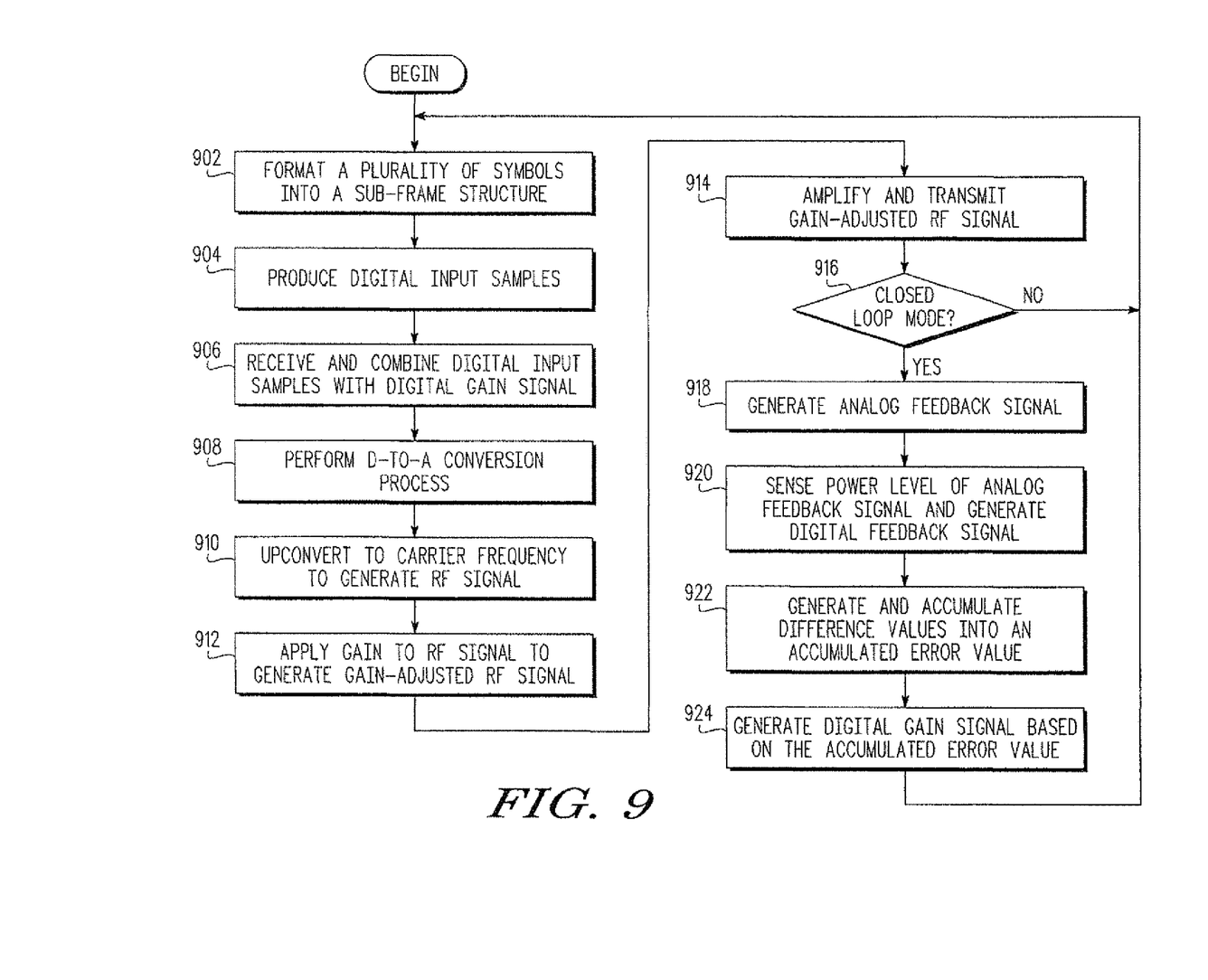
FIG. 9 illustrates a flowchart of a method for performing power measurement and control, according to an example embodiment.

FIG. 9 illustrates a flowchart of a method for performing power measurement and control, according to an example embodiment. Referring also to FIG. 8, the method may begin, in block 902, when a plurality of symbols are formatted (e.g., by processing subsystem 108, FIG. 1) into a sub-frame structure (e.g., sub-frame 200, FIG. 2), according to an embodiment. Each sub-frame may include one or more constant modulus symbols, which may include, for example, an SRS and/or one or more DRS. As used herein, the term "constant modulus symbol" refers to a symbol in which a constant modulus (e.g., in the frequency domain) signal is represented (e.g., an SRS, DRS or other type of constant modulus signal). In block 904, a sequence of digital input samples (e.g., digital input samples 812 or filtered digital input samples 813) is produced (e.g., by processing subsystem 108, FIG. 1), which represents the symbols within the sub-frame.

In block 906, the sequence of digital input samples is received (e.g., by gain application element 802) and combined with a digital gain signal (e.g., digital gain signal 814) to generate a sequence of gain-compensated digital samples (e.g., gain-compensated digital samples 816). Generation of the digital gain signal will be discussed in subsequent steps, and an assumption is made at this point that such steps have been performed based on previously transmitted RF output signals (e.g., RF antenna output signal 832). In block 908, a digital-to-analog (D-to-A) conversion process is performed (e.g., by DAC block 804) to convert the gain-compensated digital samples into the analog domain. The resulting gain-compensated analog signal (e.g., gain-compensated analog signal 818) is then upconverted (e.g., by RF modulator 806) to a carrier frequency, in block 910, in order to generate an RF signal (e.g., RF signal 820).

In block 912, a gain ramp signal (e.g., gain ramp signal 822) is generated, and gains are applied to the RF signal (e.g., by SVGA 808) based on the gain ramp signal, in order to generate a gain-adjusted RF signal (e.g., gain-adjusted RF signal 824). In block 914, the gain-adjusted RF signal (e.g., gain-adjusted RF signal 824) is amplified (e.g., by power amplifier 810) and radiated onto the air interface (e.g., by antenna 106, FIG. 1).

In block 916, a determination may be made whether the transmitter is operating in a closed loop power control mode or an open loop power control mode. When the transmitter is operating in an open loop power control mode, some or all of blocks 918-922 may be bypassed, and the method may iterate as shown. More particularly, block 922 will be bypassed, in accordance with an embodiment, and blocks 918 and 920 may or may not be performed.

When transmitter is operating in a closed loop power control mode, then in block 918, an analog feedback signal (e.g., analog feedback signal 835) is generated from the antenna output signal (e.g., RF antenna output signal 832). In block 920, instantaneous power levels of the analog feedback signal are sensed, and the sensed power levels are converted (e.g., by power detector 838) into a digital feedback signal (e.g., digital feedback signal 839), which may include a sequence of digital voltage values.

In block 922, the voltage values in the digital feedback signal are compared (e.g., by reference comparator 840) with a reference signal (e.g., reference signal 841) in order to generate a signal that includes a sequence of difference values (e.g., difference signal 843). Each difference value represents a difference between a voltage value from the digital feedback signal and a target voltage as represented in the reference signal. The difference values are accumulated (e.g., by error accumulator 842) to produce an accumulated error value (e.g., accumulated error value 845). In block 924, the digital gain signal is generated based on the accumulated error value. More particularly, according to an embodiment, the compensated gain values within the digital gain signal are generated based on the accumulated error value. The method may then iterate, as shown in FIG. 9, for subsequently received digital input samples.

As indicated previously, and according to an embodiment, a transmitter may switch between an open loop power control mode and a closed loop power control mode. During operations in a closed loop power control mode, an RF antenna output signal (e.g., RF antenna output signal 832, FIG. 8) is measured, and compensation gains represented in a digital gain signal (e.g., digital gain signal 814, FIG. 8) may be adjusted to reflect differences between the actual and target power levels of the RF antenna output signal. Conversely, during operations in an open loop power control mode, adjustments to the compensation gains may be obtained based only on values within a phasing table in order to perform power changes. Power measurement may be performed to compute open loop errors, and the corresponding entries in the phasing table may be updated. According to an embodiment, switching between a closed loop and an open loop power control modes may be performed based on whether the transmitter is transmitting a constant modulus signal (e.g., a DRS and/or SRS), among other reasons.

Figure 10:
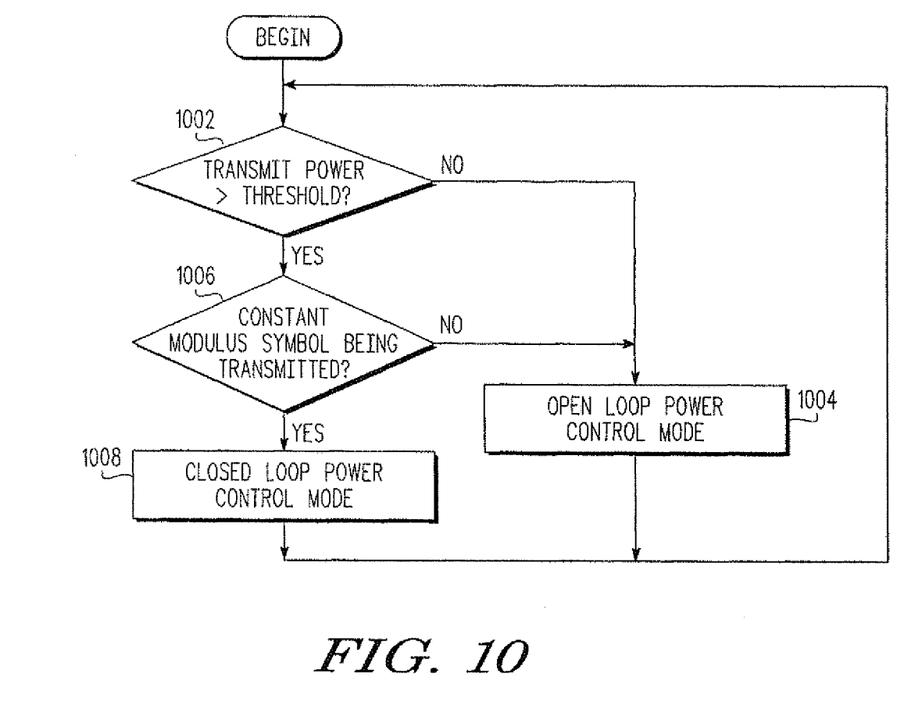
FIG. 10 illustrates a flowchart of a method for switching between an open loop power control mode and a closed loop power control mode, according to an example embodiment.

FIG. 10 illustrates a flowchart of a method for switching between an open loop power control mode and a closed loop power control mode, according to an example embodiment. An embodiment of the method depicted in FIG. 10 may be performed continuously during operation of a transmitter (e.g., during transmission of RF signals by the transmitter), according to an embodiment, although the method may be performed less frequently, in another embodiment.

In block 1002, a determination may be made whether the power of the RF signal being transmitted (e.g., RF antenna output signal 832, FIG. 8) is exceeds a power threshold. The power threshold may be, for example, 0 dBm, although higher or lower power thresholds may be implemented, as well. When the RF signal power is less than the power threshold, then the transmitter switches to or remains in an open loop power control mode, as indicated by block 1004, and the method iterates as shown.

When the RF signal power exceeds the power threshold, a further determination may be made, in block 1006, whether a specified type of constant modulus symbol is being transmitted. For example, a constant modulus symbol may be a DRS, an SRS, or another type of constant modulus symbol. When the specified type of constant modulus symbol is not being transmitted, then the transmitter switches to or remains in an open loop power control mode, as indicated by block 1004, and the method iterates as shown. As discussed previously, during operations in an open loop power control mode, adjustments to the compensation gains (and thus power changes) may be obtained based on values in a phasing table. More particularly, open loop errors may be determined based on the digital feedback samples, and the compensation gains represented in the digital gain signal may be determined from the phasing table based on the open loop errors. The entries in the phasing table may be updated accordingly.

When the specified type of constant modulus symbol is being transmitted, then the transmitter switches to or remains in a closed loop power control mode, as indicated by block 1008, and the method iterates as shown. According to an embodiment, a DRS may be considered a "specified type of constant modulus symbol", and the transmitter will switch to or remain in a closed loop power control mode when a DRS is being transmitted. According to another embodiment, an SRS may be considered a "specified type of constant modulus symbol", and the transmitter will switch to or remain in a closed loop power control mode when an SRS is being transmitted. According to yet another embodiment, both a DRS and an SRS may be considered a "specified type of constant modulus symbol", and the transmitter will switch to or remain in a closed loop power control mode when either a DRS or an SRS is being transmitted. According to yet another embodiment, the transmitter will switch to or remain in a closed loop power control mode when a different type of constant modulus symbol is being transmitted. As mentioned previously, a transmitter may operate in a closed loop power control mode while the operation point (e.g., the collector voltage) of the power amplifier is being adjusted to improve current efficiency.

It is to be understood that certain ones of the process blocks depicted in FIGS. 9 and 10 may be performed in parallel with each other or with performing other processes. For example, in a closed loop transmitter, an RF signal generated based on previously-received digital input samples may be being fed back and analyzed to determine a digital gain signal in parallel with receiving new digital input samples. In addition, it is to be understood that the particular ordering of the process blocks depicted in FIGS. 9 and 10 may be modified, while achieving substantially the same result. Accordingly, such modifications are intended to be included within the scope of the inventive subject matter.

Thus, various embodiments of wireless devices, transmitters, and methods for performing power measurement and control have been described. A particular embodiment includes a wireless device having a gain application element and a power amplifier. The gain application element is adapted to receive a sequence of digital input samples and a digital gain signal, and to combine the digital gain signal with the digital input samples to generate a sequence of gain-compensated digital samples. The power amplifier is adapted to receive and amplify an analog version of the gain-compensated digital samples in order to generate an antenna output signal. The transmitter is adapted to operate in a closed loop power control mode when a specified type of constant modulus symbol is represented in the antenna output signal, and to operate in an open loop power control mode when the specified type of constant modulus symbol is not represented in the antenna output signal.

Another embodiment includes a transmitter having a gain application element, a power amplifier, and a feedback path. The gain application element is adapted to receive a sequence of digital input samples and a digital gain signal, and to combine the digital gain signal with the digital input samples to generate a sequence of gain-compensated digital samples. The power amplifier is adapted to receive and amplify an analog version of the gain-compensated digital samples in order to generate an antenna output signal. The feedback path is adapted to generate an analog feedback signal from the antenna output signal, to produce a sequence of digital feedback samples from the analog feedback signal, to generate difference values based on the digital feedback samples, to accumulate the difference values into an accumulated error value when a specified type of constant modulus symbol is represented in the antenna output signal, and to produce the digital gain signal from the accumulated error value.

Another embodiment includes a method for performing power control in a wireless device. The method includes the steps of combining a sequence of digital input samples with compensation gain values in a digital gain signal to generate a sequence of gain-compensated digital samples, where the sequence of digital input samples represents a plurality of symbols, and amplifying an analog version of the gain-compensated digital samples in order to generate an antenna output signal. The method also includes the steps of generating an analog feedback signal from the antenna output signal, producing a sequence of digital feedback samples from the analog feedback signal, generating difference values based on the digital feedback samples, responsive to the digital feedback samples corresponding to a constant modulus symbol, accumulating the difference values into an accumulated error value, and generating the compensation gain values represented in the digital gain signal based on the accumulated error value.

Another embodiment includes a method for performing power control in a wireless device. The method includes the step of receiving a sequence of digital input samples that represent a plurality of symbols that are formatted into a sub-frame structure that includes a plurality of information-bearing symbols and at least one constant modulus symbol. The method also includes the steps of combining the sequence of digital input samples with compensation gain values in a digital gain signal to generate a sequence of gain-compensated digital samples, amplifying an analog version of the gain-compensated digital samples in order to generate an antenna output signal, generating an analog feedback signal from the antenna output signal, and producing a sequence of digital feedback samples from the analog feedback signal. The method also includes the step of performing closed loop power control using digital feedback samples corresponding to one or more of the at least one constant modulus symbol.

While the principles of the inventive subject matter have been described above in connection with specific systems, apparatus, and methods, it is to be clearly understood that this description is made only by way of example and not as a limitation on the scope of the inventive subject matter. Further, the phraseology or terminology employed herein is for the purpose of description and not of limitation.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. A method for controlling transmit power within a wireless device, comprising:
   determining a symbol type associated with one or more symbols;
   for each of the one or more symbols determined to be of a first type:
   transmitting the determined symbol of the first type according to an open loop power control mode; and
   for each of the one or more symbols determined to be of a second type, where the second type includes a sounding reference symbol (SRS) based on a Zadoff-Chu sequence:
   transmitting the determined symbol of the second type according to a closed loop power control mode.

2. The method of claim 1, where the first type comprises an information bearing type, and the second type comprises a constant modulus type.

3. The method of claim 1, where the SRS is transmitted at a fixed position within a subframe.

4. The method of claim 1, where the SRS is transmitted at a higher transmit power than an information bearing type.

5. A method for controlling transmit power within a wireless device, comprising:
   determining a symbol type associated with one or more symbols;
   for each of the one or more symbols determined to be of a first type:
   transmitting the determined symbol of the first type according to a first power level; and
   for each of the one or more symbols determined to be of a second type:
   transmitting the determined symbol of the second type according to a second power level,
   where at least one symbol type includes a sounding reference symbol (SRS) based on a Zadoff-Chu sequence.

6. The method of claim 5, where the first type comprises an information bearing type, and the second type comprises a constant modulus type.

7. The method of claim 5, where at least one of the first and second symbol types is limited to a subset of constellation points.

8. A wireless device, comprising:
   a processor;
   one or more wireless interfaces in data communication with the processor; and
   a non-transitory computer-readable storage medium comprising instructions which are configured to, when executed by the processor:
   determine that each of a first plurality of symbols are of a first type:
   configure the one or more wireless interfaces to transmit the first plurality of symbols of the first type according to an open loop power control mode;
   determine that each of a second plurality of symbols are of a second type; and
   configure the one or more wireless interfaces to transmit the second plurality of symbols of the second type according to a closed loop power control mode,
   where at least one symbol of the plurality of symbols of the second type includes a sounding reference symbol based on a Zadoff-Chu sequence and configured to assist a receiver in channel estimation.

9. The wireless device of claim 8, where the first type comprises an information bearing type, and the second type comprises a constant modulus type.

10. The wireless device of claim 8, where the sounding reference symbol is based on a truncated Zadoff-Chu sequence.

11. The wireless device of claim 8, where the sounding reference symbol is based on a cyclically extended Zadoff-Chu sequence.

12. A non-transitory computer-readable storage medium comprising instructions which are configured to, when executed by a processor:
- determine that a plurality of symbols for transmission are of a constant modulus type;
- set a transmit power level of an amplifier element to a first target power level;
- configure the amplifier element for closed loop operation; and
- transmit, during closed loop operation of the amplifier element, one or more reference symbols, which replace corresponding one or more information bearing symbols and are based on a Zadoff-Chu sequence, at fixed resource blocks (RBs).

13. The non-transitory computer-readable storage medium of claim 12, further comprising instructions which are configured to, when executed by the processor:
- for each of a plurality of symbols determined to be of an information bearing type, set a transmit power level of an amplifier element to a second target power level lower than the first target power level; and
- configure the amplifier element for open loop operation.

14. The non-transitory computer-readable storage medium of claim 13, further comprising instructions which are configured to, when executed by the processor, assign one or more of the information bearing symbols to one or more resource blocks (RBs).

* * * * *